US008721417B2

(12) United States Patent
Halverson

(10) Patent No.: US 8,721,417 B2
(45) Date of Patent: May 13, 2014

(54) METHOD AND SYSTEM FOR PROTECTION AGAINST A BAD BEAT DURING A POKER GAME BY UTILIZING A BAD BEAT CUTOFF PERCENTAGE

(76) Inventor: Aaron Joseph Halverson, Glendale, WI (US)

( * ) Notice: Subject to any disclaimer, the term of this patent is extended or adjusted under 35 U.S.C. 154(b) by 0 days.

(21) Appl. No.: 12/711,205

(22) Filed: Feb. 23, 2010

(65) Prior Publication Data

US 2010/0216532 A1 Aug. 26, 2010

Related U.S. Application Data

(60) Provisional application No. 61/155,088, filed on Feb. 24, 2009.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.

USPC .................. 463/13; 463/11; 463/16; 463/25; 273/292

(58) Field of Classification Search

USPC ........................... 463/11–13, 16–25; 273/292

See application file for complete search history.

(56) References Cited

U.S. PATENT DOCUMENTS

| | | | | |
|---|---|---|---|---|
| 5,531,448 | A * | 7/1996 | Moody | 273/292 |
| 5,752,702 | A * | 5/1998 | McDoniel | 273/292 |
| 5,810,354 | A * | 9/1998 | Banyai | 273/292 |
| 6,042,118 | A * | 3/2000 | Poitra | 273/292 |
| 6,102,402 | A * | 8/2000 | Scott et al. | 273/292 |
| 6,132,311 | A * | 10/2000 | Williams | 463/13 |
| 6,651,983 | B1 * | 11/2003 | Chobanian | 273/292 |
| 6,817,615 | B1 * | 11/2004 | Dacey | 273/292 |
| 6,938,900 | B2 * | 9/2005 | Snow | 273/292 |
| 7,611,404 | B1 * | 11/2009 | Hilf et al. | 463/13 |
| 2002/0169015 | A1 * | 11/2002 | Moody | 463/13 |
| 2005/0179206 | A1 * | 8/2005 | Cogert | 273/292 |
| 2006/0025221 | A1 * | 2/2006 | Jain et al. | 463/42 |
| 2006/0178183 | A1 * | 8/2006 | Van Asdale | 463/13 |
| 2006/0258425 | A1 * | 11/2006 | Edidin et al. | 463/16 |
| 2008/0012222 | A1 * | 1/2008 | Starzec | 273/292 |
| 2008/0088087 | A1 * | 4/2008 | Weitzman et al. | 273/292 |
| 2008/0108412 | A1 * | 5/2008 | Snow et al. | 463/20 |
| 2008/0237985 | A1 * | 10/2008 | Cogert et al. | 273/292 |
| 2009/0124316 | A1 * | 5/2009 | Baerlocher et al. | 463/13 |

* cited by examiner

*Primary Examiner* — Milap Shah

(57) ABSTRACT

A system and method of conducting a poker game in a manner which contends with bad beats. It comprises the steps of: selecting a distinct percentage (e.g. 70.0% or 80.0%) as a Bad Beat Cutoff %; selecting a specified amount as the Bad Beat Amount; conducting the selected poker game variant in accordance with conventional rules of play; calculating and recording the win probability of each player if an all-in bet occurs; awarding the Bad Beat Amount to any remaining player that lost despite having a win probability greater than the Bad Beat Cutoff % at the point of said all-in bet; and awarding the remainder of each pot to the high hand. By contending with bad beats in all-in situations, the systems and methods disclosed herein will help alleviate bad beat frustration and make poker more enjoyable for many players.

16 Claims, 4 Drawing Sheets

METHOD AND SYSTEM FOR PROTECTION AGAINST A BAD BEAT DURING A POKER GAME BY UTILIZING A BAD BEAT CUTOFF PERCENTAGE

CROSS REFERENCE TO RELATED APPLICATIONS

This application claims benefit to U.S. provisional application 61/155,088, filed Feb. 24, 2009, herein incorporated by reference in its entirety.

FIELD OF THE INVENTION

The present invention relates to a system and method of conducting a card game, and more particularly to a system and method of conducting a poker game in a manner which identifies and contends with bad beats.

BACKGROUND OF THE INVENTION

Many games that use playing cards have been played for decades. Poker is a popular card game which has been played for many years throughout the world and has many variants (i.e.—texas hold'em poker, omaha poker, stud poker, draw poker, guts, razz, etc.). The term "poker" actually refers to a family of games that typically involve placing monetary bets.

Typically, poker games are played with a standard deck of 52 playing cards. The individual cards are ranked in the following order from highest to lowest: Ace, King, Queen, Jack, 10, 9, 8, 7, 6, 5, 4, 3, 2. The suits are hearts (h), diamonds (d), clubs (c), and spades (s). The rank/suit combination of each of the 52 playing cards in the deck is unique, i.e., there is exactly one Ace of Clubs, there is exactly one Eight of Hearts, there is exactly one Jack of Spades, etc.

The objective of poker is generally to win the pot of money by obtaining the highest rank poker hand or by being the last player remaining (other players fold). The standard strength of 5-card poker hands rank in the following order from highest to lowest:

(1) Five of a Kind (five cards of the same rank, only possible when there are wild card);
(2) Straight Flush (five cards of the same suit in sequence);
(3) Four of a Kind (four cards of the same rank);
(4) Full House (three cards of one rank and two cards of another rank);
(5) Flush (five cards of the same suit);
(6) Straight (five cards in two or more suits, ranking consecutively);
(7) Three of a Kind (three cards of the same rank);
(8) Two Pair (two cards of one rank and two cards of another rank);
(9) One Pair (two cards of the same rank).
(10) High Card (highest rank card)

Most poker game variants follow the same basic pattern of play. For each hand dealt, one or more players are often required to post antes or make forced bets to create an initial stake for which the players will compete. The dealer shuffles the cards and the appropriate number of cards is dealt to each player one at a time. Cards may be dealt either face-up (common cards) or face-down (down or hole cards), depending on the variant of poker being played. After the initial deal, the first of what may be several rounds of wagering/betting begins. Between rounds, the players' hands develop in some way, often by being dealt additional cards or replacing cards previously dealt. At the end of each round of betting, all bets are gathered into the central pot (which may be comprised of main and side pots that are tracked separately). During a betting round, if a player makes a bet, opponents are required to fold, call, or raise. If one player bets and no opponents choose to match the bet, the hand ends immediately, the bettor is awarded the pot, no cards are required to be shown, and the next hand begins. At the end of the last betting round, if more than one player remains, there is a showdown in which the remaining players reveal their previously hidden cards to determine which player has the highest rank poker hand by combining the common cards (if any) with their down cards. Traditionally, the player with the highest rank poker hand (i.e., the high hand) for a given main or side pot is awarded that pot.

Poker has significantly grown in popularity to a multi-billion dollar industry. Modern poker tournament play became popular in casinos world-wide after the World Series of Poker© began in 1970. Poker's popularity experienced an unprecedented spike in the first years of the $21^{st}$ century, largely because of the introduction of online poker and the invention of the hole-card camera, which turned the game into a spectator sport on television. Broadcasts of poker tournaments, such as the World Series of Poker© and the World Poker Tour© now bring in huge audiences for television networks. Due to poker's exciting stakes, simple rules, multiple game variants, social camaraderie, media coverage, and enjoyable competitive aspects, countless people are taking up the game of poker each year. At any given time many thousands of people are playing poker world-wide through local social gatherings or via commercial venues such as poker rooms, casinos, personal electronic games, and online poker websites utilizing computer networks and software.

Mathematical probability plays a central role in poker, especially in poker variants with multiple rounds of betting (e.g., Texas Hold'em or Omaha). Most skilled poker players estimate the mathematical probability of winning before acting during game play. Players able to consistently bet with a higher win probability than their opponents and fold with a lower win probability than their opponents, should win in the long run. The relevance and popularity of utilizing win probability in poker can be seen when watching win probabilities displayed to viewers during televised poker tournaments. Similarly, there are some online poker rooms that display win probability to players in all-in situations.

The win probability of a player if they do not fold can be directly calculated. In some cases the calculation is fairly complex, but generally the probability of a player winning at a certain point in the hand can be determined by dividing the number of outcomes that satisfy the condition being evaluated by the total number of possible outcomes. Therefore, to calculate a player's win probability in poker, one must determine the number of cards remaining that will give the player the highest rank poker hand at the showdown and divide that number by the total number of remaining cards that could be dealt.

To illustrate, we can analyze the following situation in Texas Hold'em: The flop has come 6(h) 4(c) 8(h) and the 2(s) was dealt on the turn; Player 1 has gone all-in holding A(d) A(s) and Player 2 has called holding K(h) Q(h). In Texas Hold'em one more common card will be dealt. The win probability of each player can now be calculated. In this situation hitting a flush via a heart on the river is the only way Player 2 can win, making exactly nine cards (outs) needed to achieve the high hand. Those nine outs are listed as follows: {2(h), 3(h) 4(h), 5(h), 7(h), 9(h), 10(h), J(h), A(h)}. Considering that Texas Hold'em is traditionally played using a standard 52 card deck, we can also determine that there are 44 possible outcomes for the final card at this point, determined by subtracting from 52 cards the 4 common cards already exposed and the 4 down cards of these two players that have now been exposed. (52−4−4=44). Therefore, Player 2's win probability is 9 divided by 44=20.45%, making Player 1's win probability 79.55% in this situation (subtract 20.45% from 100%).

Skilled and experienced poker players are able to approximate and sometimes exactly calculated their odds of winning before they make a wager. However, in many situations calculating the exact win probability without a computer is impossible. For example, in situations before the flop in Texas Holdem, the mathematics for computing all of the possible outcomes can be quite complex. Fortunately, a computer program can perform a brute force evaluation of the 1,712,304 possible boards for any given pair of starting hands in seconds. Thus, a computer program, such as any poker odds calculator commonly downloaded from the internet, is often needed to calculate and display the exact win probability of players.

A problem with poker games of multiple betting rounds is the occurrence of bad beats. A bad beat in poker generally refers to a player losing a hand that he was clearly favored to win. Receiving a bad beat is a great frustration to poker players because it often means that despite skillful play, an unlucky and often unfair outcome resulted. Many poker players would agree that there is nothing more frustrating in poker than wagering all of your money or chips you have in play (i.e., an all-in bet) as a significant mathematical favorite to win, only to get unlucky and lose the pot from being outdrawn. The higher a player's probability of winning the hand at the time of the all-in wager yet still losing at the showdown, the more frustrating the game can be for that player. Consequently, there is a need for an alternative method of conducting poker games which helps contend with bad beats in high win probability, all-in scenarios.

There is much debate as to what exactly constitutes a bad beat in poker. Historically, the occurrences of "bad beats" have been fairly subjective as players might disagree on a case by case basis as to whether or not a bad beat occurred. It is perhaps because of this subjectivity that few solutions have been developed that attempt to contend with bad beats. Thus, there is a need to officially identify bad beats in poker, in a manner that can't be contested by players. Once a bad beat can be officially and incontestably identified, it can be contended with or eliminated more easily.

An increasingly popular means used by card-rooms and casinos (online and off-line) to increase excitement and occasionally ease bad beat frustration for poker players is the use of Bad Beat jackpots. A Bad Beat jackpot is a prize that is paid to all players involved when a sufficiently strong hand is shown down and loses to an even stronger hand held by another player. Not all poker games offer Bad Beat jackpots, and those that do have specific requirements regarding how strong a losing hand must be to qualify for the jackpot, in addition to other requirements.

Though Bad Beat jackpots can be exciting marketing tools that can result in huge prizes for players lucky enough to satisfy the necessary conditions, they fail to mitigate the majority of bad beats. The criteria to satisfy a Bad Beat jackpot are rarely met (e.g., 4-of-a-kind must lose) and when conditions are met, payment to players does not come from the contested pot, but from a progressive prize pool that is usually funded from a rake on multiple tables over many hands of play. Thus, Bad Beat jackpots are generally not feasible to use in tournament play because there are no rakes. Most importantly, player win probability, which is essential in determining mathematically correct poker decisions, has nothing to do with the Bad Beat jackpot payout criteria. Therefore, a Bad Beat jackpot does not provide poker players with a sufficient, consistent solution to their bad beat frustrations.

In a similar manner, poker rooms occasionally offer smaller promotional bonuses when a strong hand loses. For example, some casinos pay out a bonus to any player who loses holding AA in Texas Holdem in a cash game. These bonuses are an attempt to mitigate frustration and make game play more exciting and enjoyable. However, similar to Bad Beat jackpots, an additional rake is necessary to fund these promotional bonuses, making them infeasible for tournament play. Also, these bonuses do not mitigate the majority of bad beats because player win probability is not considered in the payout criteria.

Consequently, there is a need for a method of conducting a poker game that considers player win probability to help alleviate bad beat frustration more consistently. Many poker players believe winning in poker should be a matter of skillful play and making great poker decisions based on win probability. Winning should be less reliant on the luck of the draw, especially in all-in situations. Unfortunately, in the short-term, it makes little difference how skillfully you play poker when bad beats are commonplace. In a time when the game of poker is considered a competitive sport world-wide, there is need for a method of conducting poker games to properly contend with bad beats.

Several variations, systems, and methods of conducting poker games that combine one or more of the features herein are described in U.S. Pat. Nos. 5,531,448; 6,042,118; 6,132,311; 6,651,983; 6,817,615; 6,938,900; 7,056,208; and US patent application number 2008/0012222. Most of these other games and methods modify the rules of game play in some manner when compared to conventional poker. However, many card room operators and players are not interested in a changing the rules of play for their favorite or most popular poker games.

In particular, U.S. Pat. No. 7,056,208 and US Patent App #20080012222 provide examples that attempt to contend with bad beats in poker. However, they both have flaws in addressing the bad beat problem. For example, U.S. Pat. No. 7,056,208 does not utilize win probability or statistics in any way to contend with bad beats; it only allows players the option to take a portion of their bet back at different points in the hand. Without utilizing win probability, bad beats are not properly and consistently identified and contended with. Furthermore, US Patent App document #20080012222 requires that players make a "declaration" of the best hand in order to achieve bad beat protection, but requiring a "declaration" changes the rules of play and adds unnecessary complexity to game play requirements. In addition, US Patent App #20080012222 does not contain any distinct bad beat cutoff percentage needed to properly and consistently identify Bad Beats. Thus, there remains a need for a system and method of conducting a poker game to contend with bad beats that does not change the rules of game play, but utilizes win probability and a distinct cutoff percentage to properly identify bad beats. The system and method should be applicable to any poker game variant utilizing common cards and multiple betting rounds.

BRIEF SUMMARY OF THE INVENTION

Accordingly, described herein are systems and methods of conducting any poker game variant in a manner which contends with Bad Beats. For example, disclosed herein are systems and methods that comprise the steps of: selecting a distinct percentage (e.g. 70.0% or 80.0%) as a Bad Beat Cutoff %; conducting the selected poker game variant in accordance with conventional rules of play; calculating and recording the win probability of each player if an all-in bet occurs; awarding a predetermined payout or amount of the pot to any remaining player that loses despite having a win probability greater than the Bad Beat Cutoff % at the point of said all-in bet; and awarding the remainder of each pot to the high hand.

A key advantage of the disclosed systems and methods over many other poker modifications that attempt to contend with bad beats is that in the disclosed systems and methods the rules of game play are not modified for the players; only pot distribution is occasionally modified to effectively overturn a bad beat. Thus, players have no additional decisions to make when compared to the conventional poker games they already play. Another advantage of the disclosed systems and methods is the selection of a unique Bad Beat Cutoff %, which properly identifies bad beats when compared with the win probability of players. By identifying and contending with bad beats in all-in situations, the disclosed systems and methods can help alleviate bad beat frustration and make poker more enjoyable for many players.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

DETAILED DESCRIPTION OF THE INVENTION

Figure 1:
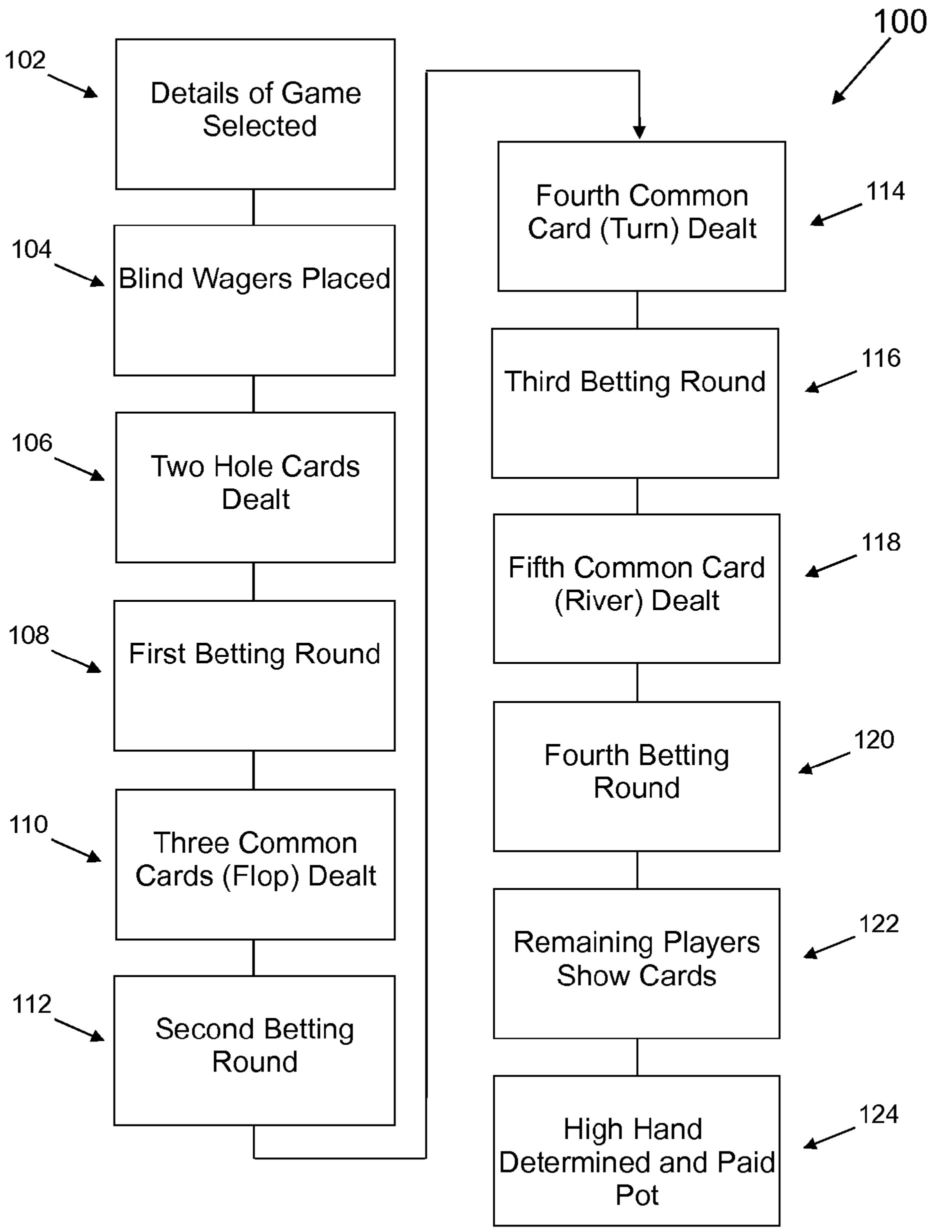
FIG. 1 (Prior Art)
FIG. 1 illustrates a flow chart detailing a conventional Texas Hold'em poker game.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

Embodiments of the methods and systems are described below with reference to flowchart illustrations of methods, systems, apparatuses and computer program products. It will be understood that each flowchart illustration can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, flowchart illustrations support combinations of means for performing the specified functions, combinations of steps for performing the specified functions and program instruction means for performing the specified functions. It will also be understood that each flowchart illustration and exemplary scenario can be implemented by special purpose hardware-based computer systems that perform the specified functions or steps, or combinations of special purpose hardware and computer instructions.

The embodiments of the disclosed systems and methods relate to the game of poker. While the embodiments of the disclosed systems and methods are suitable for any poker game with multiple rounds of betting (e.g., Omaha), the game of Texas Hold'em is used herein to describe the game. The embodiments of the disclosed systems and methods are directed to modifying conventional pot distribution in certain hands of poker and easing the impact of a bad beat wherein a player loses despite having a high win probability in an all-in bet situation. The impact of modified pot distribution may influence player betting strategy.

FIG. 1 shows a flow chart 100 detailing a method of conducting a conventional game of Texas Hold'em. At 102, the conventional details of the game, such as the table betting limit (e.g., no limit) and required blind wagers, are selected by the players and/or gaming venue. At 104, a first player places a required small blind wager and a second adjacent player places a required big blind wager. The small and big blind wagers are used to start a pot and keep players in the hand. At 106, each player is dealt two hole cards from a deck of cards. At 108, a first betting round is conducted with bets being placed in the pot started with the small and big blind wagers. At 110, three common cards are dealt (i.e., the flop). At 112, a second betting round is conducted with bets being placed into the pot. At 114, a fourth common card is dealt (i.e., the turn). At 116, a third betting round is conducted with bets being placed in the pot. At 118, a fifth and final common card is dealt (i.e., the river). At 120, a fourth betting round is conducted with bets being placed in the pot. At 122, remaining players show their hole cards. At 124, the dealer determines the player holding the highest rank poker hand (i.e., the high hand) and pays the player the pot. While not shown in the flow chart 100, the house, via the dealer, collects a rake or portion of the pot in cash games as payment for conducting the game.

Figure 2:
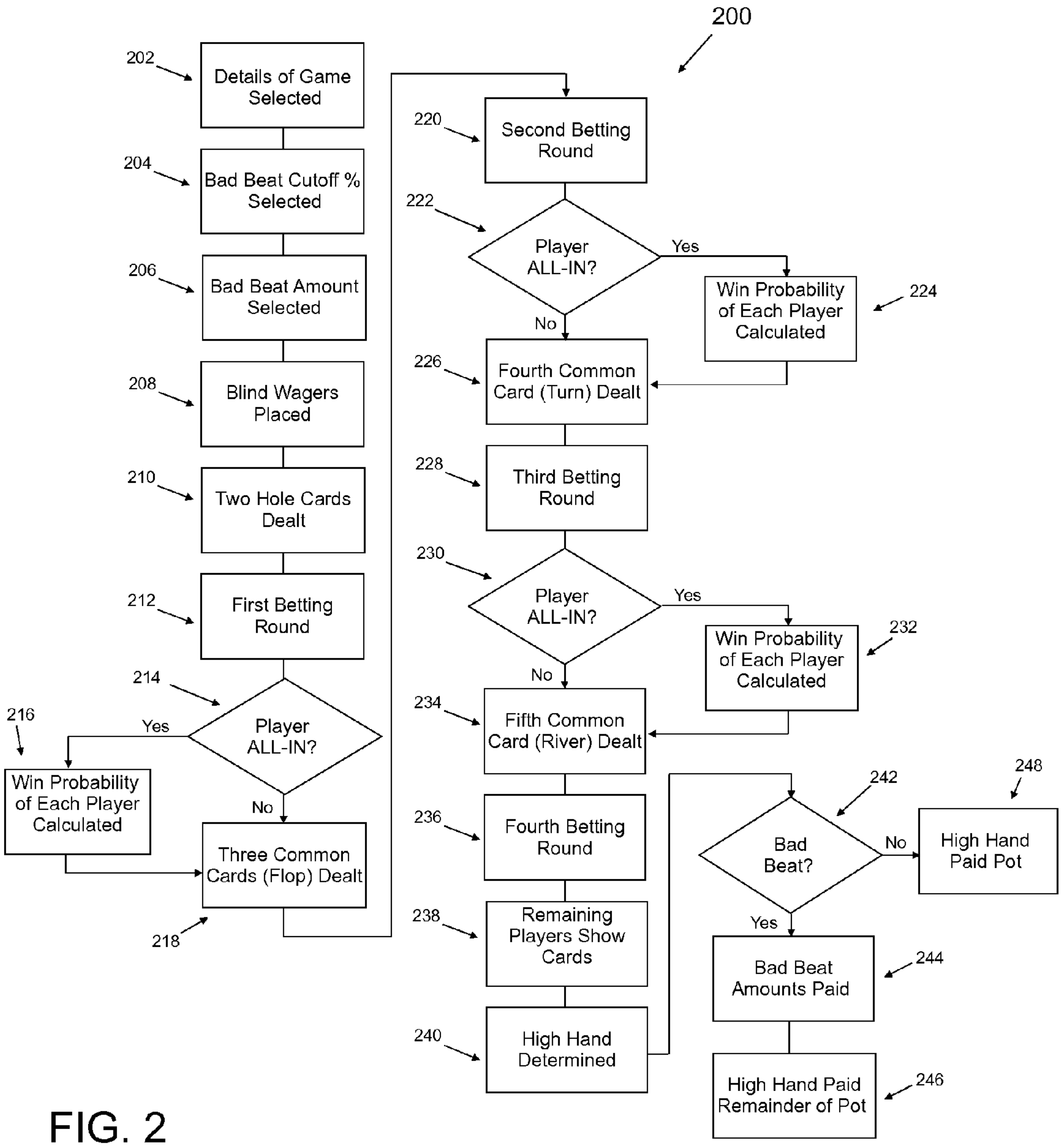
FIG. 2 illustrates a flow chart detailing Texas Hold'em according to a first embodiment of the disclosed systems and methods.

FIG. 2 shows a flow chart 200 detailing a system and method of conducting a game of Texas Hold'em according to a first embodiment of the disclosed systems and methods. At 202, the conventional details of the game, such as the table betting limit (e.g., no limit) and required blind wagers, are selected by the players and/or gaming venue. At 204, a distinct percentage, referred to herein as the Bad Beat Cutoff %, is selected by the players and/or gaming venue. The Bad Beat Cutoff % selected should be a precise percent between 50.0% and 100.0% (e.g. 70.0% or 82.5%). At 206, a specified amount, referred to herein as the Bad Beat Amount, is selected by the players and/or gaming venue. The Bad Beat Amount is the consideration awarded to a player that takes a "Bad Beat" in the present invention. The Bad Beat Amount can be any possible amount or portion of the pot considering all payout scenarios, including but not limited to the following: half the pot, the total wager a player committed to the pot, the entire pot, an amount equal to the pot divided by the number of active remaining players, an amount in proportion to the Bad Beat Cutoff or a player's win probability, a specific amount from the pot, and a specific or proportionate amount funded by means other than the pot (e.g. by additional rake). At 208, a first player places a required small blind wager and a second adjacent player places a required big blind wager. The small and big blind wagers are used to start a pot and keep players in the hand. At 210, each player is dealt two hole cards from a deck of cards. At 212, a first betting round is conducted with bets being placed in the pot started with the small and big blind wagers. At 214, the dealer determines if any player made an all-in bet when previously at 212. If so, at 216, the overall win probability of each player is calculated before proceeding to 218. If not, at 218, three common cards are dealt (i.e., the flop). At 220, a second betting round is conducted with bets being placed in the pot. At 222, the dealer determines if any player made an all-in bet when previously at 220. If so, at 224, the overall win probability of each player is calculated from that point in the hand before proceeding to 226. If not, at 226, a fourth common card is dealt (i.e., the turn). At 228, a third betting round is conducted with bets being placed in the pot. At 230, the dealer determines if any player made an all-in bet when previously at 228. If so, at 232, the overall win probability of each player is calculated from that point in the hand before proceeding to 234. If not, at 234, a fifth and final common card is dealt (i.e., the river). At 236, a fourth betting round is conducted with bets being placed in the pot. At 238, remaining players show their hole cards. At 240, the dealer determines the player holding the highest rank poker hand (i.e., the high hand). At 242, the dealer determines if any remaining player took a "Bad Beat" by satisfying all three of the following conditions: 1. The player made an all-in bet or matched an opponent's all-in bet for the contested pot; 2. The player had an overall win probability greater than the Bad Beat Cutoff % at the point of said all-in bet; 3. The player does not possess the high hand. If any remaining player satisfies all three of said conditions, at 244, the player is awarded the Bad Beat Amount (e.g., the total wager the player committed to a pot), and then at 246, the high hand is paid the remainder of the pot. If no player satisfies all three of said conditions, at 248, the high hand is paid the entire pot in the conventional manner.

Note that within the one aspect of the disclosed systems and methods, the outcome of the majority of hands played would be the same as conventional poker. That is, unless an all-in bet is called, a player's win probability is greater than the Bad Beat Cutoff %, and the likely winner actually loses, the pot and/or payouts would be distributed in the conventional manner. Also, similar to a bad beat jackpot (prior art), players need make no additional decisions to be eligible for the Bad Beat Amount. Consequently, the minimal impact on both game play and payouts in the majority of hands is advantageous. By consistently alleviating bad beat frustration with minimal apparent modification to popular existing poker games, the disclosed systems and methods can facilitate immediate player adaptation and create tremendous marketing potential.

Figure 3:
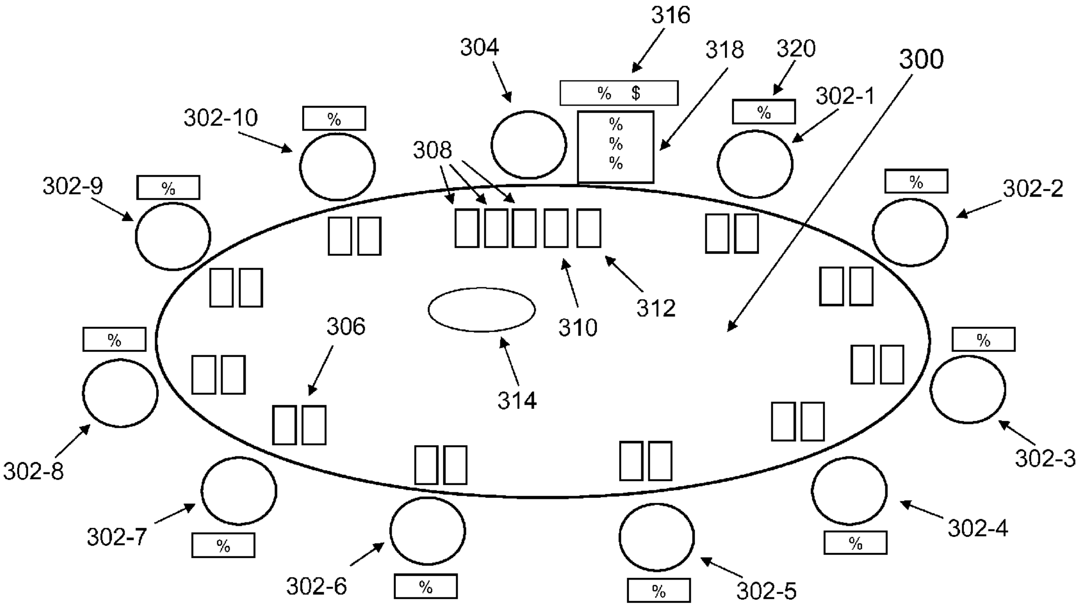
FIG. 3 illustrates an exemplary poker table layout which may facilitate the embodiments of the disclosed systems and methods.

FIG. 3 shows an exemplary poker table layout 300 which may facilitate the embodiments of the present invention. Table 300 accommodates ten player positions 302-1 through 302-10 and a dealer position 304. As shown, each player position 302-1 through 302-10 shows two hole cards 306, and five common cards shown in a center position on the table 300, including the flop cards 308, turn card 310, and river card 312. Also near center position of table 300 is pot area 314, which may provide a convenient area for dealer position 304 to collect and distribute consideration in the pot. Also near dealer position 304 is a sign or display 316 and a computer with monitor 318. Sign or display 316 may display to players the selected Bad Beat Cutoff % and/or Bad Beat Amount. Computer with monitor 318 may be used by the dealer to calculate and view the win probability of players to determine if any player is entitled to the Bad Beat Amount. In addition, located next to each player position 302-1 through 302-10 is a player win probability display 320, which would be generated by computer means to display the calculated win probability of each player in all-in situations, particularly useful for a system on an online poker website and/or programmed computer software on a computer network. Those skilled in the art will recognize that other means may be used to calculate and display win probability of players, notify players of the Bad Beat Cutoff % and Bad Beat Amount, and properly distribute Bad Beat Amounts to players.

Figure 4:
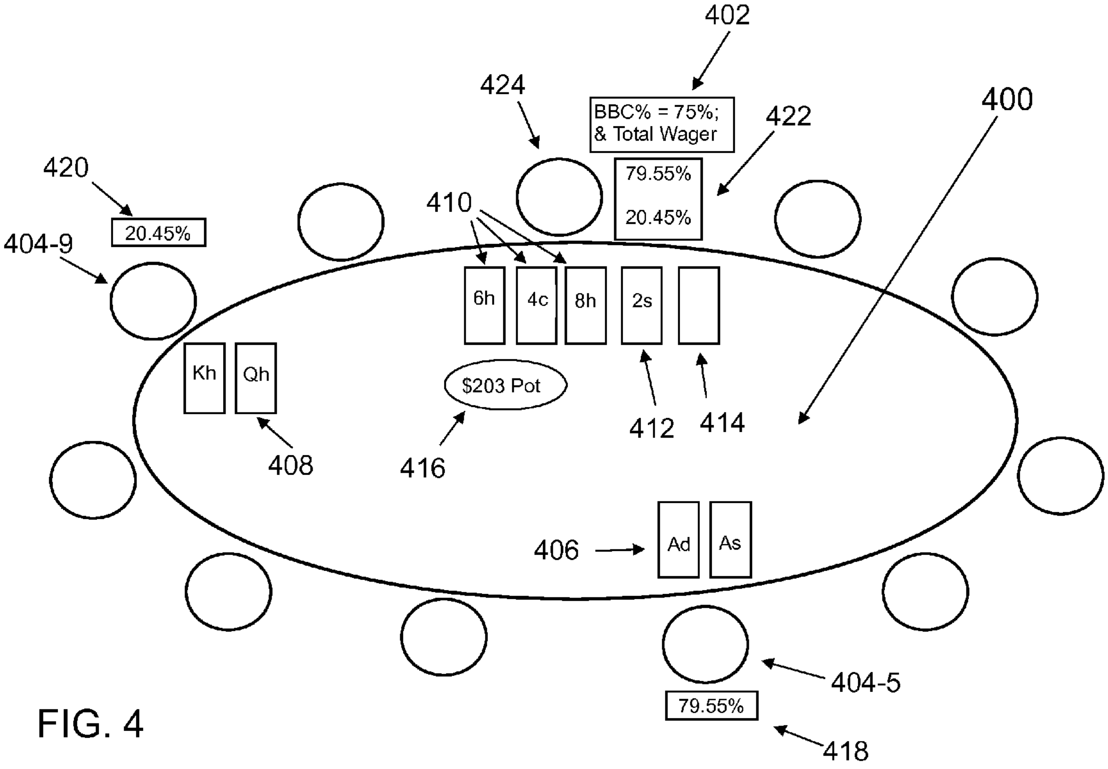
FIG. 4 illustrates an exemplary two-player all-in scenario according to one embodiment of the disclosed systems and methods.

FIG. 4 shows an exemplary two player all-in scenario on table 400 according to one embodiment of the disclosed systems and methods. A sign or display 402 notifies players the Bad Beat Cutoff % selected is 75.0% and the Bad Beat Amount selected is the total wager committed to the pot by a player. As shown, player position 404-5 shows hole cards 406 of A(d) A(s) while player position 404-9 shows hole cards 408 of K(h) Q(h). The common cards dealt are flop cards 410 of 6(h) 4(c) 8(h), and turn card 412 of 2(s). In this scenario, assume player position 404-9 called the all-in bet of player position 404-5 after the turn was dealt, creating pot 416. Further assume that pot 416 totals $203 made up of $100 wagered by player position 404-5, $100 wagered by player position 404-9, and $3 from players who folded in the small and big blind. No additional betting will take place in this scenario, so the overall win probability of each player is displayed prior to the final card being dealt. Player win probability display 418 shows the 79.55% win probability of player position 404-5, while player win probability display

420 shows the 20.45% win probability of player position 404-9. A computer with monitor 422 also displays these figures. Because the win probability of 79.55% is greater than the Bad Beat Cutoff % of 75.0% in this all-in scenario, if river card 414 was dealt as a 9(h) or any remaining heart-suited card, then player position 404-5 would be awarded the Bad Beat Amount of $100 from pot 416 and player position 404-9 would be awarded $103, the remainder of the pot. Note the Bad Beat Amount was $100 in this scenario because that was the total wager player position 404-5 committed to pot 416.

While the discussion above focuses on the calculation of overall win probability, the embodiments are also suitable for calculating and utilizing head-to-head win probability. In other aspects, "head-to-head win probability vs the high hand" would be compared to the Bad Beat Cutoff % in order to determine if a player would be awarded the Bad Beat Amount. In a two-player scenario the outcome would be the same regardless if overall win probability or "head-to-head win probability vs high hand" is used. However, in some multiple player scenarios, the use of "head-to-head win probability vs high hand" would have a different outcome and may be preferable to overall win probability.

In one embodiment of the disclosed systems and methods, the Bad Beat Amount selected would be an amount equal to the total wager committed to the relevant pot by losing player. Thus, "If you take a bad beat, you get your money back". Said selected Bad Beat Amount is simple for players to comprehend. Also, in a live game, it is relatively easy for the dealer to keep player wagers separate, allowing for easy refund if required.

In one embodiment of the disclosed systems and methods, the Bad Beat Cutoff % selected in Texas Hold'em would be at 70.0%, which is a number that protects players as a 2:1 favorite to win. Other players may prefer 60.0%, mainly because it grants protection to a big pocket pair versus two under cards on a flush draw after the flop is dealt. Other players may feel 60%-70% is too low and think 80%-90% more desirable because it eliminates only the worst of bad beats. It is envisioned that the Bad Beat Cutoff % may differ from table to table based on the preference of players.

In one embodiment of the disclosed systems and methods, the only cards considered as "known" cards in win probability calculation would be the common cards and the hole cards of active remaining players in the hand. This is consistent with how most poker odds calculators work and seems most logical since these cards will often be exposed (turned over) in all-in scenarios. On the contrary, other cards that are accidentally exposed or cards of other players that folded would not be included in the win probability calculation.

In one embodiment of the disclosed systems and methods, the total win probability of each player would include the probability of a tie occurring. Though it is not necessary, the probability of a tie added seems to be fair and logical after considering the following situation in Texas Hold'em: After a flop of A(s) 4(c) 9(h), Player 1 goes all-in with A(c)K(c) and Player 2 calls with A(h)K(h). In this example there is a very small chance of either player losing to the other (only 4.55% for each player or 9.1% together) as it would take two running cards of a player's suit to win outright. What is most likely is the 90.9% probability of a tie occurring between these two players. Some players consider it unfair for either player to go bust (lose the all-in) in this situation since they got all-in with a 95.5% chance of winning (4.6% outright plus 90.9% chance of winning by a tie). Therefore, in this aspect the probability of a tie would be included in the calculation of the win probability. Doing so would increase the win probability to 95.5% for each player in this situation, which would result in an official bad beat if either player lost, since 95.5% is greater than the Bad Beat Cutoff % of 70.0%. This way if either Player 1 or Player 2 loses, they would be entitled to the Bad Beat Amount (i.e., half of the pot).

Poker probability calculations are often complex and are of high importance in this invention. To calculation win probability, determine satisfaction of the Bad Beat Amount payout conditions, and display results to players, the disclosed methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices. The specific device, hardware, and/or software application used will likely vary for each poker venue. For example, the gaming software of an online poker room could calculate and display win probabilities to players during the hand and/or through hand history. On the other hand, in a live home game, players might use a computer laptop to access a poker odds calculator online (such as found at www.cardplayer.com). In a brick and mortar casino, each table might have a computer, software program, and/or video monitor to generate win probabilities, or the dealer may use some other electronic means to input hand data for calculation and communicate results to players.

It will be recognized by those skilled in the art that the embodiments are suitable for electronically-implemented poker games including stand alone gaming machines and online poker games. With online poker games, the embodiments are programmed into software driving online poker websites such that win probabilities will be automatically calculated in all-in situations and Bad Beat Amounts will be automatically distributed to players as required. Online poker websites allow players to access online poker games via a computer terminal in the form of a display and interface (PC, cellular telephone, PDA, etc.). An Internet server hosts the website and via computer means (e.g. processor, micro-controller or similar device) controls the poker game utilizing software and randomizing means.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Although some aspects of the disclosed systems and methods have been described in detail with reference to several embodiments, additional variations and modifications exist within the scope and spirit of the invention as described and defined in the following claims.

What is claimed:

1. A method of conducting a poker game, comprising the steps of:

a) selecting a poker variant to be played using at least a deck of playing cards and a card table, the poker variant including multiple rounds of betting whereby a plurality of players compete only against one another;

b) selecting a predetermined Bad Beat Cutoff Percentage;

c) selecting a predetermined Bad Beat Amount;

d) providing the plurality of players with one or more concealed cards from the deck of playing cards as required by a set of rules defining the selected poker variant;

e) providing one or more community cards, if any, from the deck of playing cards and allowing the multiple rounds of betting during play of a hand of poker, wherein players may fold, place bets, or place all-in bets while proceeding to a showdown step of the hand of poker, as required by the set of rules of the selected poker variant;

f) calculating, via one or more processors, and recording, via one or more memory devices, an overall win probability percentage of each of the plurality of players who have not yet folded from a point of the hand of poker at which an initial all-in bet was placed by one of the plurality of players during the multiple rounds of betting of step (e), using at least any concealed cards and community cards, if any;

g) determining a poker hand ranking for each of the plurality of players remaining at the showdown step of the hand of poker by evaluating any concealed cards and community cards, if any, for the hand of poker;

h) calculating a pot for the hand of poker including amounts bet during each of the multiple rounds of betting and each of the all-in bets during the multiple rounds of betting of step (e);

i) awarding the predetermined Bad Beat Amount to any one of the plurality of players remaining at the showdown step if all three of the following conditions are satisfied: (1) the player either made the initial all-in bet or matched the all-in bet after the initial all-in bet was placed during the multiple rounds of betting of step (e); (2) the player had an overall win probability percentage, calculated at step (f), greater than the predetermined Bad Beat Cutoff Percentage; and (3) the player does not possess the highest ranking poker hand for the hand of poker at the conclusion of the showdown step; and j) after awarding the predetermined Bad Beat Amount, calculating a remainder of the pot by subtracting the predetermined Bad Beat Amount from the pot if funded by the pot, and awarding the remainder of the pot to one or more players that do possess the highest ranking poker hand for the hand of poker at the conclusion of the showdown step.

2. The method of claim 1, wherein the overall win probability, calculated at step (f), denotes the mathematical probability of a player achieving the highest ranking poker hand once all remaining cards have been dealt.

3. The method of claim 1, wherein prior to play of the selected poker variant commencing the players or a gaming venue selects the preferred methodology to calculate the overall win probability, calculated at step (f), including whether the probability of a tie occurring at the showdown will be included or whether one or more exposed cards or the one or more concealed cards of opponents will be included as known cards in the calculation.

4. The method of claim 1, wherein the Bad Beat Cutoff Percentage, selected at step (b), may be selected to differ depending on the number of players that remain active in the contested pot at the showdown.

5. The method of claim 1, wherein the Bad Beat Amount, selected at step (c), is selected prior to play commencing by the players or a gaming venue, at any possible amount or portion of the pot, from the group comprising: half the pot, a total amount one of the plurality of players committed to the pot, the entire pot, an amount equal to the pot divided by the number of active remaining players, a specific amount from the pot, and an amount in proportion to the Bad Beat Cutoff Percentage or a player's overall win probability.

6. The method of claim 1, wherein the Bad Beat Amount, selected at step (c), can be selected to differ depending on the number of players that remain active in the pot at the showdown.

7. The method of claim 1, wherein the Bad Beat Amount, selected at step (c), can be funded by any source selected from the group comprising: the pot for the hand, an additional rake collected from each pot in cash games, and direct funding by the gaming venue as a promotional bonus.

8. The method of claim 1, wherein the selected poker variant is Texas Hold'em or Omaha.

9. The method of claim 1, wherein steps (a) through (j) are executed by a processor of an electronic card game system.

10. An electronic card game system configured for play over a computer network accessible by player terminals, said terminals including at least a display and user interface, the electronic card game system comprising a processor configured to:

a) allow selection of a poker variant to be played, the poker variant including multiple rounds of betting whereby a plurality of players compete only against one another;

b) allow selection of a predetermined Bad Beat Cutoff Percentage;

c) allow selection of a predetermined Bad Beat Amount;

d) randomly select and cause to be displayed one or more concealed cards from a simulated deck of playing cards to the plurality of players accessing said computer network, as required by a set of rules defining the selected poker variant;

e) randomly select and cause to be displayed one or more community cards, if any, from the simulated deck of playing cards, and allow the multiple rounds of betting during play of a hand of poker, wherein players may fold, place bets, or place all-in bets while proceeding to a showdown step of the hand of poker, as required by the set of rules of the selected poker variant;

f) calculate and record an overall win probability percentage of each of the plurality of players who have not yet folded from a point of the hand of poker at which an initial all-in bet was placed by one of the plurality of players during the multiple rounds of betting of step (e), using at least any concealed cards and community cards, if any;

g) determine a poker hand ranking for each of the plurality of players remaining at the showdown step of the hand of poker by evaluating any concealed cards and community cards, if any, for the hand of poker;

h) calculate a pot for the hand of poker including amounts bet during each of the multiple rounds of betting and each of the all-in bets during the multiple rounds of betting of step (e);

i) award the predetermined Bad Beat Amount to any one of the plurality of players remaining at the showdown step if all three of the following conditions are satisfied: (1) the player either made the initial all-in bet or matched the all-in bet after the initial all-in bet was placed during the multiple rounds of betting of step (e); (2) the player had an overall win probability percentage, calculated at step (f), greater than the predetermined Bad Beat Cutoff Percentage; and (3) the player does not possess the highest ranking poker hand for the hand of poker at the conclusion of the showdown step; and j) after awarding the predetermined Bad Beat Amount, calculate a remainder of the pot by subtracting the predetermined Bad Beat Amount from the pot if funded by the pot, and awarding the remainder of the pot to one or more players that do possess the highest ranking poker hand for the hand of poker at the conclusion of the showdown step.

11. The electronic game system of claim 10, wherein the Bad Beat Amount, selected at step (c), is selected prior to play commencing by the players or gaming venue, at any possible amount or portion of the pot considering every payout scenarios, from one or more of the group comprising: half the pot, a total amount a player committed to the pot, the entire pot, an amount equal to the pot divided by the number of active remaining players, a specific amount from the pot, an additional rake collected from each pot in cash games, direct funding by the gaming venue as a promotional bonus, and a specific or proportionate amount funded by means other than the pot.

12. The electronic game system of claim 10, wherein the processor is configured to allow the players or a gaming venue to decide the precise methodology of calculating the overall win probability, including whether the probability of a tie occurring at the showdown is included and which known cards will be included in the calculation.

13. The electronic game system of claim 10, wherein the processor is configured to allow the players or a gaming venue to select a differing Bad Beat Amount at step (c) or a differing Bad Beat Cutoff % at step (b), depending on the number of players that remain active in the contested pot at the showdown.

14. The electronic game system of claim 10, wherein the selected poker variant is Texas Hold'em or Omaha.

15. The electronic game system of claim 10, wherein the player terminals are selected from the group comprising: personal computers, cellular phones, and personal digital assistant devices.

16. A method of conducting a poker game, comprising the steps of:

a) selecting a poker variant to be played using at least a deck of playing cards and a card table, the poker variant including multiple rounds of betting whereby a plurality of players compete only against one another;

b) selecting a predetermined Bad Beat Cutoff Percentage prior to commencing play of the selected poker variant;

c) selecting a predetermined Bad Beat Amount prior to commencing play of the selected poker variant;

d) providing the plurality of players with one or more concealed cards from the deck of playing cards as required by a set of rules defining the selected poker variant;

e) providing one or more community cards, if any, from the deck of playing cards and allowing the multiple rounds of betting during play of a hand of poker, wherein players may fold, place bets, or place all-in bets while proceeding to a showdown step of the hand of poker, as required by the set of rules of the selected poker variant;

f) calculating, via one or more processors, and recording, via one or more memory devices, an overall win probability percentage of each of the plurality of players who have not yet folded from each point of the hand of poker at which an all-in bet was placed by one of the plurality of players during the multiple rounds of betting of step (e), using at least any concealed cards and community cards, if any;

g) calculating a main pot and one or more side pots, if any, for the hand of poker including amounts bet during each of the multiple rounds of betting and each of the all-in bets during the multiple rounds of betting of step (e), as required by a set of rules defining the selected poker variant;

h) determining a poker hand ranking for each of the plurality of players remaining at the showdown step of the hand of poker for the main pot and each side pot, if any, by evaluating any concealed cards and community cards, if any, for the hand of poker as required by a set of rules defining the selected poker variant;

i) awarding the predetermined Bad Beat Amount for to any one of the plurality of players remaining at the showdown step if all three of the following conditions are satisfied: (1) the player either made or matched an all-in bet in the main or the one or more side pots during the multiple rounds of betting of step (e); (2) the player had an overall win probability percentage, calculated at step (f), greater than the predetermined Bad Beat Cutoff Percentage; and (3) the player does not possess the highest ranking poker hand for the main or the one or more side pots at the conclusion of the showdown step; and j) after awarding the predetermined Bad Beat Amounts, calculating a remainder of the main pot and each side pot by subtracting the predetermined Bad Beat Amount from each pot if funded by the respective pot, and awarding the remainder of each pot to one or more players that do possess the highest ranking poker hand at the conclusion of the showdown step of the poker hand.

* * * * *